W. F. DOERFLINGER.
APPARATUS FOR THE MANUFACTURE OF STANNIC CHLORID.
APPLICATION FILED FEB. 5, 1913.
1,087,437.
Patented Feb. 17, 1914.
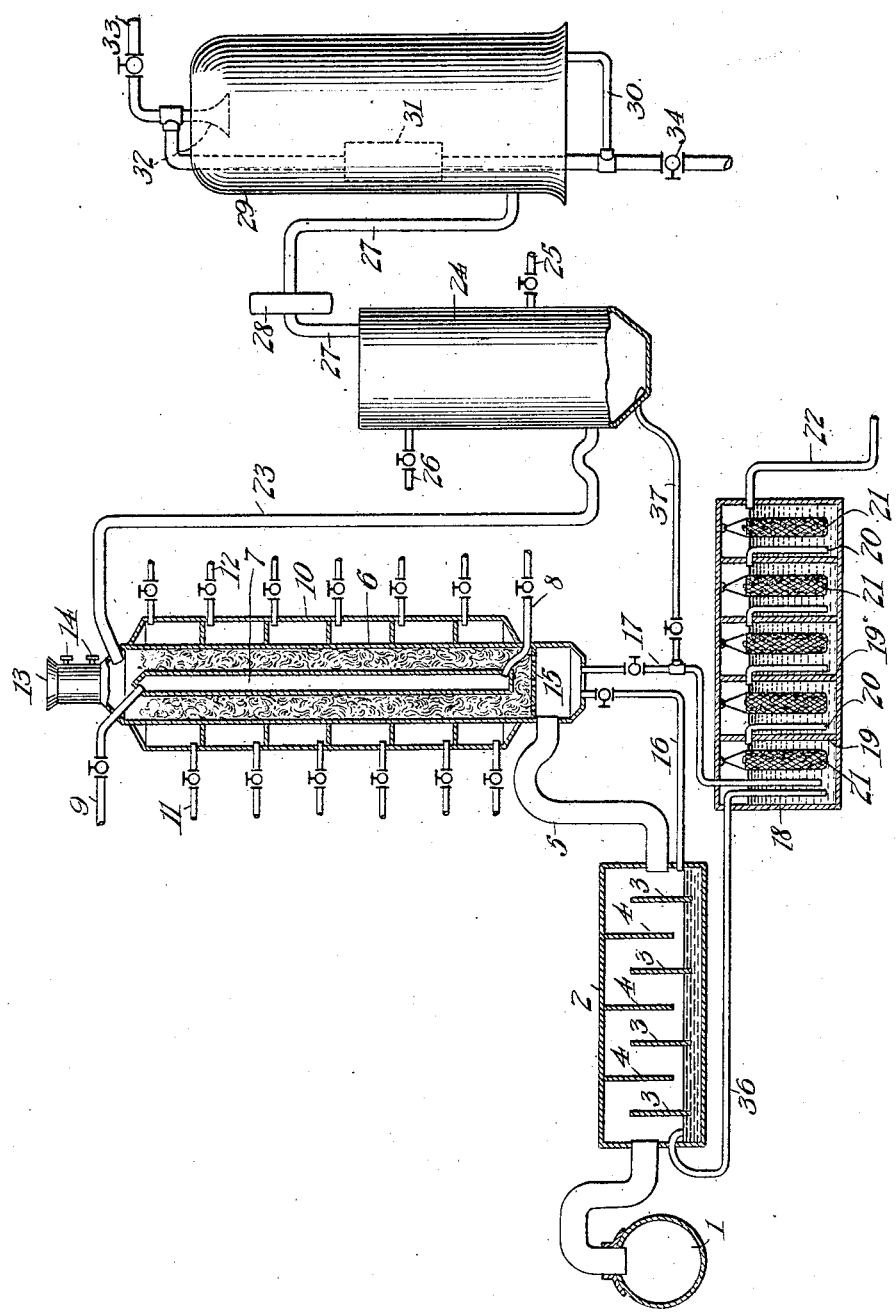

UNITED STATES PATENT OFFICE.

WILLIAM F. DOERFLINGER, OF HALESITE, NEW YORK, ASSIGNOR, BY MESNE ASSIGNMENTS, TO NIAGARA ALKALI COMPANY, A CORPORATION OF NEW YORK.

APPARATUS FOR THE MANUFACTURE OF STANNIC CHLORID.

1,087,437.  Specification of Letters Patent.  Patented Feb. 17, 1914.

Original application filed February 5, 1908, Serial No. 414,299. Divided and this application filed February 5, 1913. Serial No. 746,254.

*To all whom it may concern:*

Be it known that I, WILLIAM F. DOERFLINGER, a citizen of the United States, residing at Halesite, in the county of Suffolk and State of New York, have invented certain new and useful Improvements in Apparatus for the Manufacture of Stannic Chlorid, of which the following is a full, clear, and exact description.

The object of the present invention is to provide an apparatus which while being especially suited for the production of stannic chlorid by the process described herein, is also suitable for various other processes, and certain of the parts of this apparatus may be used for carrying out various other processes, particularly processes in which temperature control is necessary or desirable, and it is to be understood that the apparatus is not restricted to any particular use, nor to the treatment of any particular materials, but may be used for various purposes.

In my improved process, described and claimed in my co-pending application #414,299, filed February 5th, 1908, of which the present application is a division, anhydrous stannic chlorid is procured by the action of dry chlorin gas, in the presence of stannic chlorid vapor, upon metallic tin, preferably at a temperature of about 35° C., the heat of reaction being dissipated by cooling surfaces near the point of reaction and the anhydrous chlorid being allowed to drain away as formed. This stannic chlorid, or part of it, I use to saturate the entering chlorin gas with stannic chlorid vapor for the purpose of removing all traces of water from the chlorin. The presence of water being prejudicial, the use of stannic chlorid vapor as mentioned is desirable since, as I have found, it is difficult otherwise to get the chlorin thoroughly dry. In fact, I have found that chlorin, even after passing through a sulfuric acid drying tower, usually contains enough moisture to interfere with the smooth course of the manufacture and often results in the formation of undesirable by-products. To saturate the chlorin with the stannic chlorid vapor I prefer to pass the chlorin in inverse direction to a stream of anhydrous stannic chlorid, on the counter-current principle in the same apparatus, hereafter referred to as the absorber, in which the tin and the dry chlorin combine, but I prefer to employ for the purpose a separate apparatus. This apparatus 1 term the saturator, and in this the chlorin, passing over an extended surface of liquid stannic chlorid flowing in the opposite direction, becomes saturated with stannic chlorid vapor. With the latter such moisture as the chlorin may contain combines to form tri-hydrate, which drops to the bottom and may be melted and run off from time to time. The liquid anhydrous stannic chlorid flowing from the absorber and saturator is yellow from dissolved chlorin, which may be removed by digestion with metallic tin, in practice by simply allowing this chlorid to flow past and in contact with the metallic tin. If the chlorid is in motion the action proceeds rapidly, but if it is quiet it may stand in contact with the tin for a long time before the chlorin is entirely removed. It is preferable to have the tin suspended in the stream instead of lying on the bottom of the apparatus below the stream, as the former tends to make the action more rapid and complete.

In the annexed drawing I have illustrated, somewhat diagrammatically, a simple and convenient apparatus constructed in accordance with the present invention.

The drawing shows a side view partly in vertical section of the apparatus for producing the anhydrous stannic chlorid.

In said drawing 1 represents a conduit through which chlorin gas enters the system, and passes to the saturator or drier 2. This is preferably provided with vertical baffles of which those numbered 3 leave spaces at the top and bottom, and those numbered 4 leave spaces at the bottom only, above the surface level of the liquid stannic chlorid therein.

5 represents a gas outlet from the saturator, or drier, to the main reaction vessel, or absorber, shown at 6. This vessel contains a temperature regulating element 7, which may be used for removing the heat of the reaction, by supplying a cooling agent through the pipe 8 which leaves through pipe 9. In addition to this, the reaction vessel is provided with a temperature regulating jacket 10, which is preferably composed of a plurality of small units, each of which has its inlet and outlet, as illustrated, and by which various temperatures may be maintained in different portions of the reaction vessel. If a liquid is used in these jackets it will preferably enter through the pipes 11, and leave through pipes 12. If steam is to be used in the jackets it will enter through pipes 12, and the exhaust (together with any condensate) will leave through pipes 11.

The several pipes 11 and likewise the several pipes 12, and the pipes 8 and 9 are each independently operable, for producing any desired temperature conditions in the reaction vessel, or in any part thereof, to suit particular requirements in any particular process in which this apparatus is used. The tin or other solid material to be acted upon in the reaction is introduced at 13, which may be provided with a double lock, as illustrated at 14. This material rests upon a perforated bottom 15, through which the stannic chlorid, or other liquid product passes, and may be drawn off through valved pipes 16 and 17, into the saturator 2, and finisher 18 respectively. The finisher may be a box-shaped vessel 18, provided with partitions 19, overflow pipes 20, and containing baskets 21, for holding tin or other material for reacting upon free chlorin to convert the same into stannic chlorid, or if the apparatus is being used for another purpose, to react with the liquid or with any constituent thereof, to produce any desired change therein.

22 is the outlet of the finisher, and in the process referred to, anhydrous stannic chlorid, devoid of free chlorin leaves at this point.

The gases leaving the reaction vessel 6, pass through pipe 23 to condenser 24, provided with an inlet 25 and outlet 26, for cooling liquid. This condenser may be of any approved type. The gases leaving the condenser 24, pass by pipe 27 and fan 28 to the washing tower 29. Here the gases are washed with water or other suitable liquid to remove the last traces of stannic chlorid. The wash liquor may circulate from the outlet pipe 30, pump 31, inlet rose 32, and may be used until any desired strength of solution is obtained, when the valve in pipe 34 will be opened to allow this to be drawn off for use or for sale, and more water allowed to come in through pipe 33. The liquid stannic chlorid in the saturator 2, can flow through pipe 36 into the finisher 18, and the liquid from the condenser 24 can flow through pipes 37 and 17 into finisher 18.

What I claim is:—

1. In an apparatus for treating a solid with a fluid reagent, a reaction vessel provided with an inlet for solid material, an inlet for a fluid reagent, an interiorly located temperature regulating member, and a plurality of independently controllable temperature regulating jackets.

2. In an apparatus for treating a solid with a fluid reagent, a reaction vessel provided with an inlet for solid material, an inlet for a fluid reagent, an interiorly located temperature regulating member, and a plurality of independently controllable temperature regulating jackets, and a perforated support for said solid material.

3. In an apparatus for treating a solid with a fluid reagent, a reaction vessel provided with an inlet for solid material, an inlet for a fluid reagent, an interiorly located temperature regulating member, and a plurality of independently controllable temperature regulating jackets, and a plurality of independently controllable means for removing the product produced in said vessel.

4. In an apparatus for treating a solid with a fluid reagent, a reaction vessel provided with a double sealed inlet for solid material, and inlet for a fluid reagent, an interiorly located temperature regulating member, and a plurality of independently controllable temperature regulating jackets.

5. An apparatus for treating a solid material with a fluid comprising a reaction vessel provided with a double locked inlet for solid material, an inlet for fluid reagent, an interiorly located temperature regulating member, a plurality of independently controllable temperature regulating jackets, a perforated support for said solid material and an outlet for the product of reaction.

6. An apparatus for treating a solid material with a fluid comprising a receptacle provided with an inlet for fluid, an inlet for solid material, a temperature regulating member within said receptacle, and a temperature regulating jacket surrounding said vessel, a perforated support near the bottom of said receptacle for said solid material, and an outlet located below said perforated support.

In testimony whereof I affix my signature in the presence of two subscribing witnesses.

WILLIAM F. DOERFLINGER.

Witnesses:
M. LAWSON DYER,
WM. BOHLEBER.